United States Patent
Shoemaker, Jr.

(10) Patent No.: US 10,514,024 B1
(45) Date of Patent: Dec. 24, 2019

(54) QUICK DISCONNECT FOR VACUUM DRONE DELIVERY

(71) Applicant: Stephen P. Shoemaker, Jr., Redondo Beach, CA (US)

(72) Inventor: Stephen P. Shoemaker, Jr., Redondo Beach, CA (US)

(*) Notice: Subject to any disclaimer, the term of this patent is extended or adjusted under 35 U.S.C. 154(b) by 0 days.

(21) Appl. No.: 16/400,863

(22) Filed: May 1, 2019

(51) Int. Cl.
*F04B 35/04* (2006.01)
*B64C 39/02* (2006.01)
*B64D 1/02* (2006.01)

(52) U.S. Cl.
CPC ............ *F04B 35/04* (2013.01); *B64C 39/024* (2013.01); *B64D 1/02* (2013.01); *B64C 2201/128* (2013.01)

(58) Field of Classification Search
CPC . F04B 35/04; B64C 39/024; B64C 2201/128; B64D 1/02
See application file for complete search history.

(56) References Cited

U.S. PATENT DOCUMENTS

| | | | | |
|---|---|---|---|---|
| 3,295,789 A | * | 1/1967 | Hill ................... | B64C 29/0075 244/159.3 |
| 2018/0194469 A1 | * | 7/2018 | Evans ................. | B64C 39/024 |
| 2019/0049971 A1 | * | 2/2019 | Tanaka ................ | G05D 1/0094 |
| 2019/0077027 A1 | * | 3/2019 | Tanaka ................ | B25J 15/0641 |

* cited by examiner

*Primary Examiner* — Valentina Xavier
(74) *Attorney, Agent, or Firm* — Fulwider Patton LLP

(57) ABSTRACT

A detachment system for a delivery aerial drone is disclosed. The detachment system uses a pump to apply a negative pressure to a suction cup for attaching an object to be delivered. The weight of the object is coupled to a mechanical switch, such that setting down the object opens the switch and disconnects the pump. Once the pump is disconnected from its power source, the suction is removed and the object disconnects from the vacuum system. The weight of the object is coupled to a mechanical switch, such that setting down the object opens the switch and disconnects the pump. Thus, the object releases once it is gently placed on a surface such that its weight is removed from the drone.

7 Claims, 2 Drawing Sheets

QUICK DISCONNECT FOR VACUUM DRONE DELIVERY

BACKGROUND

Drones have become a very popular mode for delivering various items. From packages to food to medical supplies, a drone can bring things quickly and conveniently without a delivery person, avoiding obstacles, traffic, car breakdowns, etc. Improvements in drone navigation has led to many new uses for the technology. The limitations of drone delivery are weight, distance, and improving the detachment of the item from the drone once delivered. It is the latter issue that is the subject of the present invention.

As the drone device is unmanned, it must be able to quickly, reliably, and automatically disengage with its payload without fail. Typically, this has been done using some kind of latching mechanism that hooks and unhooks some structure that can cause the item to be delivered to drop or become damaged. However, using the drone's battery or some drone release mechanism can be complicated and require special access to the complicated workings and electronics of the drone. The latching mechanism can frequently stick or fail to open, leaving the delivery operation in peril, particular in environments such as wind, cold, or near seawater. Accordingly, a better detachment mechanism is needed.

SUMMARY OF THE INVENTION

A vacuum detachment can provide both the simplicity and reliability that is needed for a drone detachment system. The release system described can plug into and use the drone battery system or is a self-contained, battery operated, unit that itself attaches to the drone at one end, while the other end connects to the item being delivered. When not in use, the vacuum delivery system may be simply unattached and stored until next time.

The present invention uses a weight bearing switch wherein the object to be delivered supplies the force needed to control the vacuum and keep the object attached. Once the object is set down, the switch opens and the negative pressure from the pump is eliminated, releasing the object to be delivered with no bounce or jolt as it is released. There is no moving parts of the connection between the object to be delivered and the delivery system, just suction. As such, the operation of the invention is far more reliable and effective with virtually no malfunctions or delivery failures.

One particular use for the vacuum delivery system is in the fishing industry. The process of delivering bait to remote locations in open water is safer and more reliable than existing methods. Most drones have video capabilities and this can be used to spot fish and place bait in the right location. Other uses include the delivery of food to stranded or inaccessible victims or people. An operator can view the location for placing a payload using the drone camera system and placing the payload precisely where the operator intends. For example, a fisherman can look for a tuna or other fish in the camera system and place the bait right near the fish and then attempt to catch the gathering fish. A hunter can place a trap at the entrance to an animals den making the likelihood of a catch better. These are just samples of potential uses.

DETAILED DESCRIPTION OF THE PREFERRED EMBODIMENTS

Figure 1:
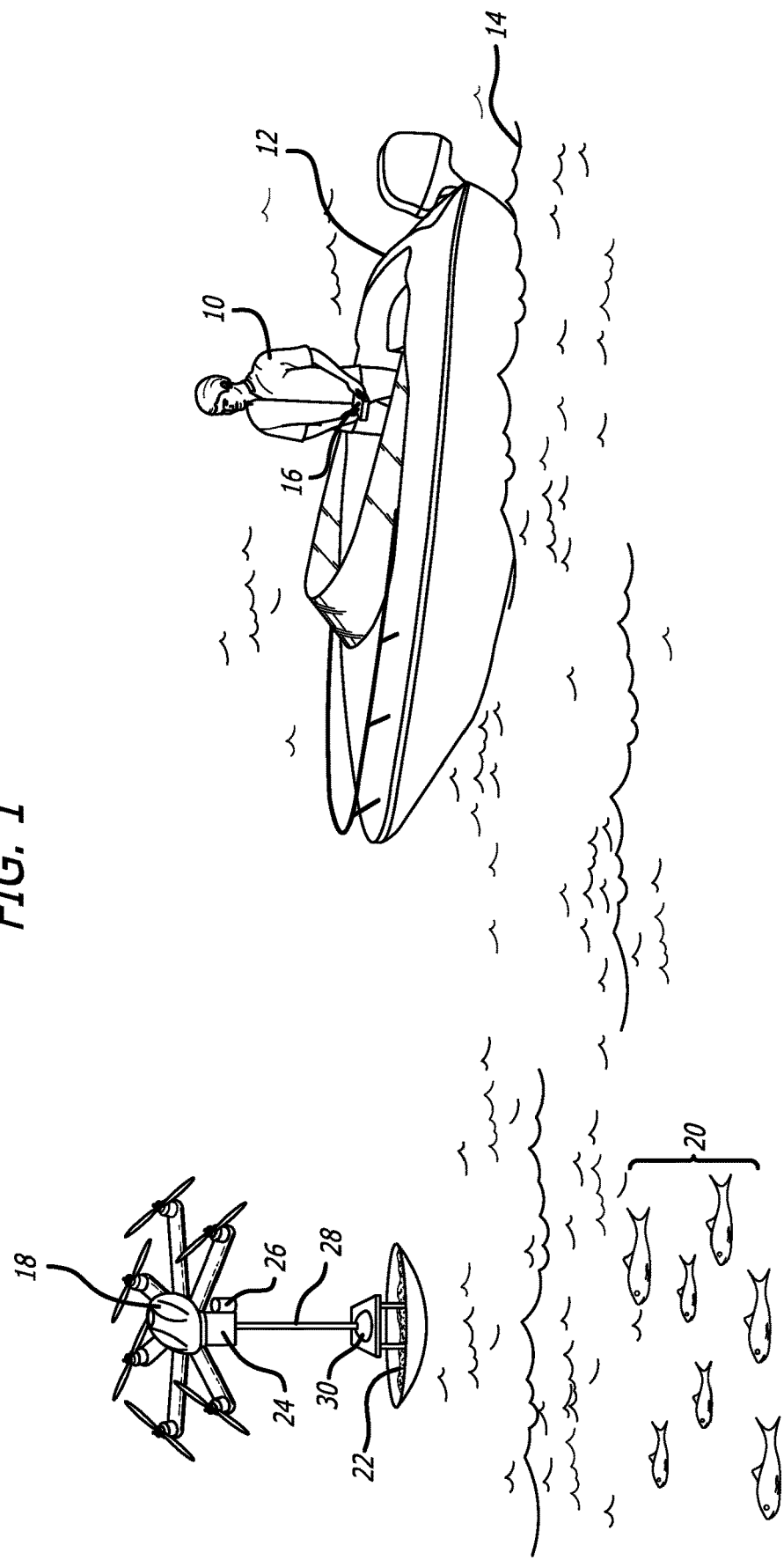
FIG. 1 is an illustration of a drone delivery system in a fishing application.

FIG. 1 illustrates an example of a use of the present invention. User 10 occupies a boat 12 on a body of water 14, and uses a remote control 16 to operate an airborne drone 18. Below the drone is an area occupied by a school of fish 20, where the user 10 wants to deliver the bait, hook and sinker. Above the bait there is a plastic float that lands on the water, allowing the pressure switch to open which in turn turns off the vacuum and releases the bait. If a fisherman wants the bait to sink, the float may include a hole that eventually allows water to enter, causing the float to sink.

The drone 18 is equipped with a vacuum delivery device 24 having a vacuum motor 26 that is coupled to an elongate tube 28. The tube leads to a cup 30 that can be used to connect to the bait or some carrier that can be lowered into the water to deliver the bait. The vacuum motor 26 applies a suction within the tubing 28 when the motor is on, capturing the item to be delivered to the cup 30. Disconnecting the vacuum releases the item easily without the need for a latching mechanism to open, greatly simplifying the detachment operation without dropping the package. The item to be delivered is simply "placed" when the vacuum motor is stopped, or the negative pressure is removed from the tube 28.

Figure 2:
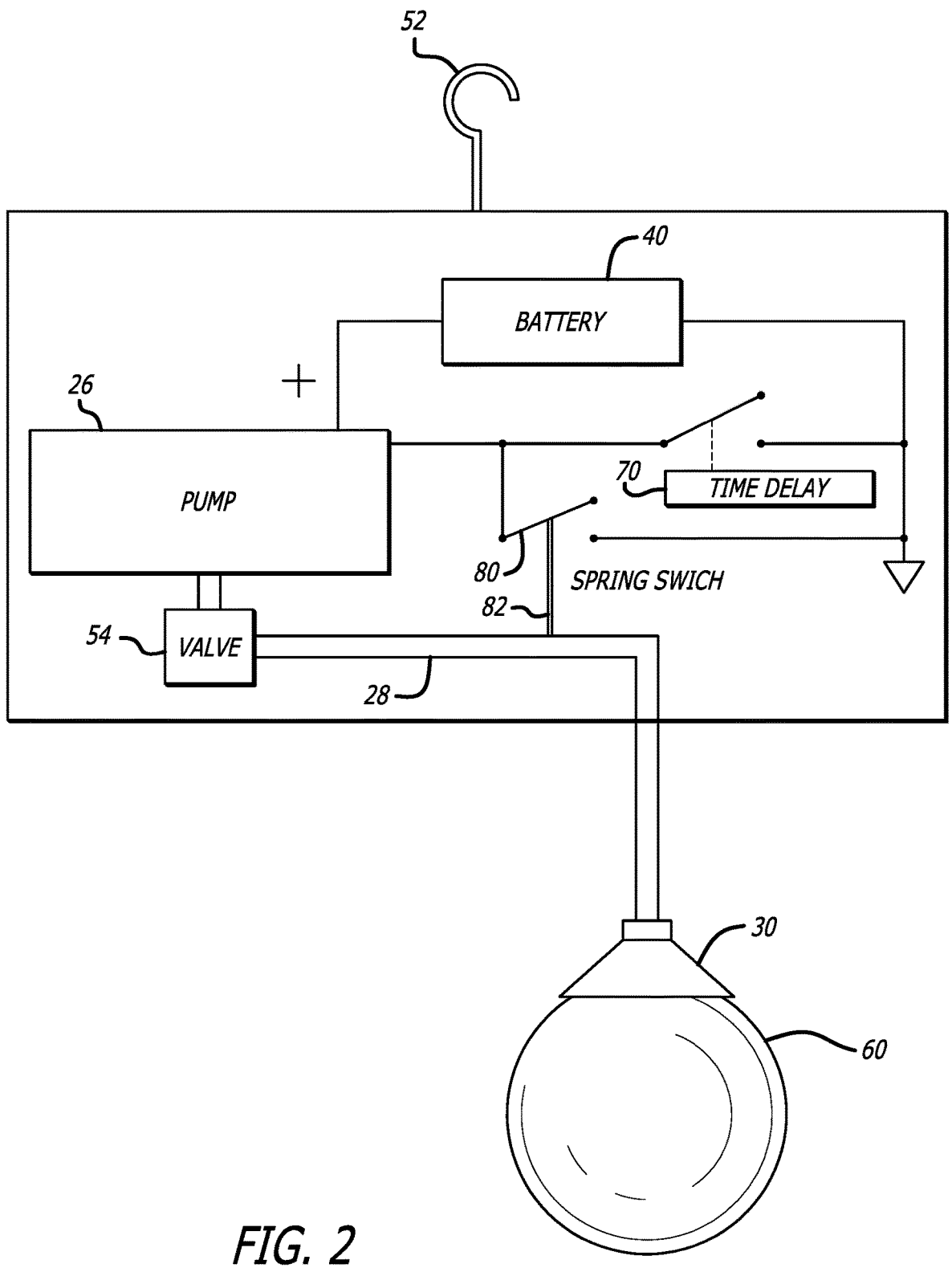
FIG. 2 is an elevated, perspective view of the detachment system.

FIG. 2 shows a quick disconnect system for a delivery drone. The system has a power source 40, which may or may not be part of the drone itself. In some embodiments, an independent power supply, battery, is preferred so as not to complicate the delivery system. The power source 40 is connected in a closable circuit to a pump 26, which includes a hook 52, magnet, cable, screw fitting, or other temporary attachment device to the bottom of the drone. The pump 26 includes a vacuum release valve 54 that connects the pump to the tube 28. When the release valve is opened, the negative pressure in the tubing is equalized, allowing the object to be placed. Cup 30 is at the distal end of the tube 28 and uses the negative pressure developed from the pump 26 to apply a suction to the object 60 to be delivered.

The circuit that connects the pump 26 and power supply 40 has a time delay circuit and switch 70 and a mechanical spring switch 80. The spring switch 80 is connected to the vacuum tube which attaches to, and uses, the weight of the object/tube combination to keep the switch 80 in the closed position. Once the object 60 is set onto a surface and the weight of the object is removed from the tube 28, the switch 80 is no longer held closed by the weight of the object 60 and the spring switch 80 opens. The time delay switch may be a five second to sixty second delay switch that allows the operator to place the suction cup onto the item to be delivered. After take-off the power to the pump is replaced by the spring switch 80. Once the time delay switch opens, only the spring switch 80 keeps the circuit closed and the pump 26 powered by the power supply 40.

In operation, the attachment device 52 is coupled to a part of the drone 18 that is accessible. The time delay switch 70 is activated, which closes the electrical circuit and sends power from the power supply 40 to the pump 26. The power activation in the pump 26 closes the release valve 54 to creates vacuum to the suction cup 30. With the suction cup attached to the object 60, the drone is then sent into flight. The weight of the object 60 holds the spring switch 80 closed, so that both the time delay 70 and the spring switch 80 are now closed and there is redundancy in the electrical circuit. As long as one of the switches 70,80 are closed, power is communicated to the pump 26, negative pressure is delivered to the cup 30, and the object 60 is held firmly in place.

The object 60 holds the spring switch 80 closed, until the time delay 70 expires and the time delay switch 70 opens. The weight of the object 60 on the spring switch 80 is then the only condition keeping the vacuum pump power connection intact. Once the drone is over the delivery point, the object is set down onto some surface, water, etc., alleviating the weight of the object on the spring switch 80. When the object 60 is placed down the lack of weight allows the spring switch to open, opening the electrical circuit and shutting off the pump. The object automatically disconnects with no suction present in the cup, and then the drone returns to the user leaving the object in the desired location.

The invention can be used for fun or ordinary deliveries of pizza, boxed fast food, medical supplies to homes or businesses. Once the object of almost any size or shape is picked up it is held by the suction cup and closes the spring switch until placed down, whereupon the vacuum system detaches, the item is placed, and the drone returns. Another use for the invention is trapping, i.e., placing a trap in a good, safe, remote spot is easy. Using the drone's video system, the user may find the exact location for placement, placing the trap which will release it, and return the drone to the user. Using the video camera, the invention is well suited for fishing: using the drone's video camera, the drone is flown over the water until a fish is spotted. The drone is then flown close and lower until a ball float and bait rest on the water. The ball float releases the spring switch, detaching the unit from the drone. Alternately, the drone can be used for bottom fishing. Here, the ball float (or other hollow float) has small hole(s). The suction cup is placed in a location without the hole(s), and the drone is flown to the location and places the float on the water. The weightlessness opens the spring switch and detach the vacuum unit. The float will linger until the holes allow water to enter the float causing it to sink.

I claim:

1. A drone delivery system, comprising:
   an aerial drone;
   an attachment for connecting a delivery system to the aerial drone;
   a power supply;
   a pump;
   a release valve coupled to the pump;
   a tube connected to the release valve;
   a suction cup;
   a delay switch for opening a circuit path between the power supply and the pump after a predetermined time; and
   a spring switch tethered to the tube, the spring switch selected to close when an object is supported by the tube and open when an object is not supported by the tube;
   whereby the pump is automatically disconnected from the power supply when the delay switch is opened and the object is set onto a surface.

2. The drone delivery system of claim 1, wherein the attachment is a hook.

3. The drone delivery system of claim 1, wherein the delay switch opens automatically at between five and sixty seconds.

4. The drone delivery system of claim 1, wherein the suction cup is connected to fish bait.

5. The drone delivery system of claim 1, wherein the suction cup is connected to an animal trap.

6. The drone delivery system of claim 1, wherein the suction cup is connected to a food package.

7. The drone delivery system of claim 1, wherein the power supply is a battery independent of the aerial drone.

* * * * *